March 14, 1967 R. J. WOJCIKOWSKI 3,308,685
DIFFERENTIAL GEARING DEVICE HAVING
A SELF-CONTAINED CLUTCH THEREIN
Filed Jan. 13, 1965 3 Sheets-Sheet 1

INVENTOR.
RICHARD J. WOJCIKOWSKI
BY Walter E. Pavlick
Harold D. Stoll

INVENTOR.
RICHARD J. WOJCIKOWSKI
BY Walter E. Pavlick
Harold D. Shall

March 14, 1967

R. J. WOJCIKOWSKI 3,308,685

DIFFERENTIAL GEARING DEVICE HAVING
A SELF-CONTAINED CLUTCH THEREIN

Filed Jan. 13, 1965

*INVENTOR.*
RICHARD J. WOJCIKOWSKI
BY *Walter E. Pavlick*
*Harold D. Shall*

United States Patent Office 3,308,685
Patented Mar. 14, 1967

3,308,685
DIFFERENTIAL GEARING DEVICE HAVING A SELF-CONTAINED CLUTCH THEREIN
Richard J. Wojcikowski, Toledo, Ohio, assignor to Dana Corporation, Toledo, Ohio, a corporation of Virginia
Filed Jan. 13, 1965, Ser. No. 425,304
7 Claims. (Cl. 74—711)

This invention relates to differential gearing devices of the limited slip type and more particularly to such devices wherein the compensating action of the gearing is inhibited by a resiliently preloaded self-contained clutch means.

The conventional differential, as used today in most motor vehicles, divides the driving torque equally between both driving wheels. Accordingly, in this connection, it should be noted that a conventional differential is free to differentiate and if one wheel is incapable of transmitting any torque because of a lack of traction with the ground, no torque will be transmitted to the other wheel even if the latter has traction. Thus, under these conditions the vehicle wheel having traction will remain stationary while the vehicle wheel having no traction will be driven and rotated by the differential while transmitting no torque. When the term "free to differentiate" is utilized, it should be noted that any unintentional friction acting upon and within the differential is being ignored. Therefore, it is seen that vehicles equipped with conventional differentials have definite disadvantages while being driven under adverse conditions, as when the traction of one of the vehicle wheels is limited by slippery road conditions.

Various types of limited slip or reluctant differentials have been proposed in an effort to provide that a substantial driving torque is available to both driving wheels of a motor vehicle even though one of the driving wheels has little or no traction, and still permit the differential mechanism to have some compensating action when one wheel must rotate faster than the other, as where the vehicle is making a turn. Some of these prior art structures have been provided with resiliently preloaded clutch means to inhibit or retard the free compensating action of the differential gearing. Other structures have been provided with means which utilize the axial thrust of the differential side gears or some other means responsive to the transmission of torque by the differential mechanism to load the friction clutch means. In addition to this torque responsive loading, some structures utilize resilient means in the form of coil springs between the side gears to provide a preload on the friction clutch means. In this particular case, however, this minimum preload adversely affects the normal operation and backlash of the side gears since it affects the intermeshing of the gear teeth of the differential gear train.

Other prior art structures also utilize the axial thrust of the differential side gears as a torque responsive means to load the friction clutch means as well as incorporating a resilient means for preloading the clutch means. In one such structure the clutches are provided with pressure plates which extend radially beyond the side gears and the resilient means are disposed between such pressure plate extensions and impose their acting loads simultaneously on both of the clutch means independently of the differential housing and the gear teeth of the gear train. Accordingly, the resilient means is shared by both clutch means and imposes an equal preloading force thereon and the resilient means cannot be incorporated in the assembly simultaneously with the clutch components.

Another prior art structure utilizes, in addition to the torque responsive means, a resiliently preloaded clutch means wherein the resilient means imposes the preload on the clutch means independently of the gear train by preloading the clutch means between a pair of spaced abutment means provided on the differential casing. Here again, the preloading of the clutch means must be accomplished during the actual assembly of the differential and if the casing abutment means are worn or damaged, the preload becomes affected often requiring the replacement of the entire casing.

In these above referred to prior art differentials, the assembling of the clutch components into the differential housing presents a major problem. Also the manufacturing tolerances in machining the casing areas which receive the clutch components and the various cooperating parts are critical and variations therein may also cause undesirable operational characteristics.

In a copending application (filed by M. A. Ordorica on even date herewith) one form of a self-contained preloaded multiple disk clutch is disclosed which is adapted to be contained within the differential casing for cooperation with such casing and a side gear. This clutch includes a plurality of interleaved friction disks, some of which have radially outwardly extending tangs thereon and clips are provided to axially engage the tangs of the axially outer of the clutch members thereby resiliently preloading the friction disks in an integral pack and the differential unit incorporating this clutch alleviates many of the problems encountered with the above referred to prior art devices.

The embodiments of the instant invention are improvements over such prior art devices, particularly in the utilization of a unitary self-contained preloaded clutch pack which may be pre-assembled as a resiliently preloaded unit before the various components of the differential device are assembled in the casing and, when assembled with such components, provides a differential device in which the differential action is frictionally inhibited so that a usable amount of torque will be transmitted to either vehicle wheel even though one of the same may have little or no traction. Further, the devices of the instant invention provide a clutch wherein the preload is substantially circumferentially uniform and wherein the clutch pack forming means need not engage tangs formed on the friction members.

Therefore, an object of the present invention is to provide a friction mechanism in the form of a preloaded multiple disk clutch for a differential device in a motor vehicle which is capable of maintaining a resilient friction load inhibiting differential action of the differential device.

Another object of this invention is to provide a differential device with a clutch arrangement for inhibiting the differentiation thereof, wherein means are provided for imposing a resilient energizing force to the clutch arrangement independently of the differential device and, further, wherein said means insures that the resilient load on the clutch arrangement is substantially circumferentially uniform.

Still another object of this invention is to provide a differential device including a differential casing, a gear train disposed in said casing and a pair of unitary self-contained clutch means for inhibiting relative rotation of members of said gear train, wherein separate resilient means are provided for each of the clutch means, and each resilient means preloads the clutch means associated therewith independently of the casing, the elements of the gear train, the teeth of the gear train and the other of the clutch means.

Still another object of this invention is to provide a differential device including unitary self-contained friction clutch means for inhibiting the free differential action thereof wherein the clutch means is resiliently preloaded independently of the gear casing, the elements of the gear train and of the meshing engagement of the gear train.

Another object of this invention is to provide such a differential as described immediately above which includes loading means responsive to the transmission of torque by the differential device for imposing a load on the clutch means, which loading means may include a portion of the device.

A further object of this invention is to provide a preloaded multiple disk clutch unit which can be quickly assembled and disassembled as a unitary self-contained unit.

Yet a further object of this invention is to provide a differential device with a unitary self-contained resiliently preloaded clutch means which may be readily installed or removed from the differential gear device independently or simultaneously with other components of the unit.

A still further object of this invention is to provide a differential device with a differentiation inhibiting clutch means which is of simple construction, easy and economical to manufacture yet is very durable.

Other objects and advantages of this invention will appear in the following description and appended claims, reference being had to the accompanying drawings forming a part of this specification wherein like reference characters designate corresponding parts in the several views. In the drawings:

In one embodiment of this invention a differential power transmission gear train is operatively disposed within a gear casing. Clutch means is operatively disposed between the gear train and the casing to oppose relative rotation between members of the gear train. Resilient means independent of the gear train and the gear casing provides an initial force on the clutch means so that the latter is in the form of a unitary self-contained resiliently preloaded clutch means. Additionally, means responsive to the transmission of torque by the differential transmission unit are provided to impose a load on the clutch in the form of gears of the gear train meshed in a relationship to provide a component of tooth pressure for urging at least one of the gears of the gear train axially outward so that a portion thereof engages the clutch means and thereby adds to the initial loading of the clutch means in response to the transmission of torque by the gear train.

Figure 1:
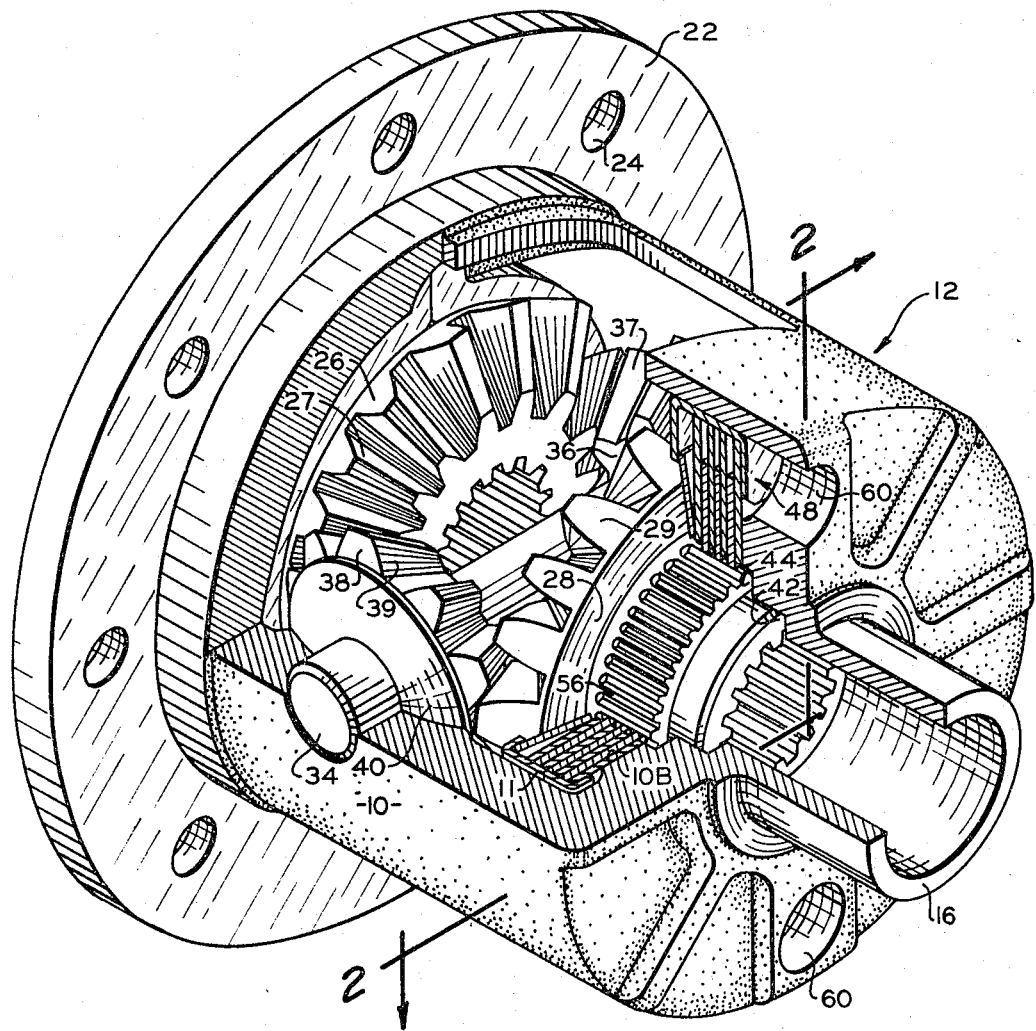
FIG. 1 is an isometric view, partially in section, showing a differential transmission embodying the preloaded clutch means of this invention.
Figure 2:
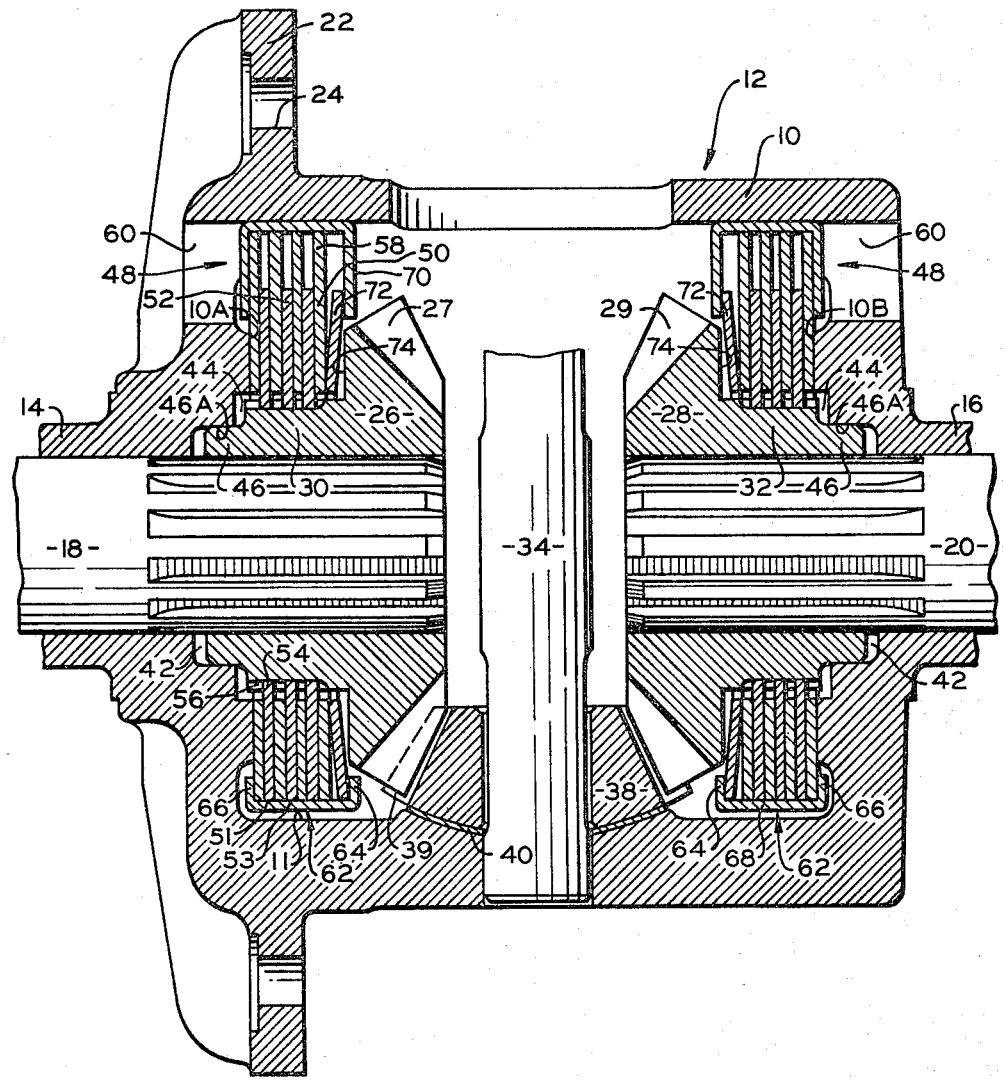
FIG. 2 is an axial sectional view of the differential transmission mechanism taken along the lines 2—2 in FIG. 1.

Referring to the drawings, particularly FIGS. 1 and 2, the casing 10 of a differential transmission unit shown generally at 12 is provided with integrally formed opposed hubs 14 and 16 extending axially from the ends thereof. A pair of opposed axle or output shafts 18 and 20 have their adjacent or inner ends projecting into the hubs 14 and 16 respectively and are rotatable relative to the casing 10 and to each other. The axle shafts 18 and 20 at their outer ends are suitably connected to the driving wheels (not shown) of a vehicle equipped with the differential device 12 of this invention. A conventional ring gear (not shown) is attached to a circumferential flange 22 formed on the casing 10 as by means of bolts (not shown) which are secured through apertures 24 in the flange. The ring gear is adapted to receive drive torque from a suitable source (not shown) and to drive the casing 10 about its axis of rotation. As is well known, the casing 10 is enclosed and rotatably mounted in a conventional manner within a differential housing (not shown) which carries the usual supply of lubricant for the differential transmission unit 12.

Rotatably positioned within the casing 10 and coaxially therewith are output or side gears 26 and 28 arranged in an opposed spaced-apart facing relation. The side gears 26 and 28 are provided with axially outward extending hubs 30 and 32 respectively which are internally splined to receive mating external splines on the axle shafts 18 and 20 respectively whereby the side gears are mounted on the axle shafts for unitary rotation therewith and axial movement relative thereto.

Extending diametrically through the casing 10 and centrally between the side gears 26 and 28 is a spider member or pin 34. The spider member 34 is of elongated substantially cylindrical configuration and rotatably carries thereon a pair of diametrically opposed compensating or pinion gears 36 and 38 adjacent its outer ends and, upon the casing 10 being drivingly rotated about its axis, the member 34 drives the pinion gears to rotate unitarily with the casing about the axis of the latter.

The compensating gears 36 and 38 have teeth 37 and 39 respectively intermeshed with teeth 27 and 29 respectively of the side gears 26 and 28, which teeth have positive pressure angles and are adapted to transmit torque between the gears 26, 28 and 36, 38 and, upon such transmission of torque, the teeth act as cams and urge the side gears 26 and 28 axially outward and the pinion gears 36 and 38 radially outward. Thrust washers 40 are inset in the casing 10 and have a contour conforming to and cooperating with the outer faces of the pinion or compensating gears 36 and 38 to limit outward movement thereof upon rotation of the gears. Annular spaces 42 and 44 are provided between each side gear and the adjacent portion of the casing 10 to permit axial outward movement of the side gears; each of the hubs 30 and 32 being provided with a pilot portion 46 of reduced diameter rotatably and axially slidably received in counterbores 46A formed in the casing 10. It is noted that with the structure as above described, the side gears 26 and 28 are rotatable relative to each other and to the pinion gears 36 and 38 and that the pinion and side gears are all rotatable relative to the casing 10. Also, if any one of the gears 26, 28, 36 or 38 is inhibited from rotating relative to the casing 10 or relative to another of the gears, the differential action of the entire device 12 will be inhibited.

A pair of clutch assemblies or unitary self-contained clutch packs, each being indicated generally by the numeral 48, are provided with one being disposed axially intermediate each side gear 26 and 28 and the adjacent radially extending internal end wall or engaging face 10A and 10B respectively of the casing 10, which assemblies are adapted to inhibit relative rotation of the members or gears 26, 28, 36 and 38 of the gear train. Although two clutch assemblies 48 are shown in the drawings, in some cases one clutch assembly will suffice inasmuch as the provision of a frictional resistance between two relatively rotating members of the differentiating differential transmission unit is effective throughout the same.

Figure 3:
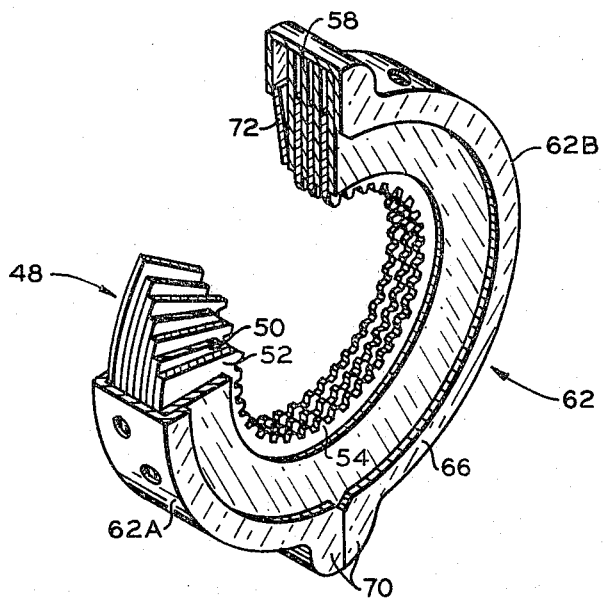
FIG. 3 is a fragmentary isometric view of a unitary self-contained resiliently preloaded clutch means of this invention.

More particularly and referring to FIGS. 1, 2 and 3, each clutch assembly 48 includes first and second pluralities of interleaved friction members or plates 50 and 52, which members have cooperating radially extending friction surfaces thereon and are adapted to be pressed into frictional engagement and thereby provide a clutching engagement between such members. The members 52 are annular in shape and are provided with a plurality of internal splines 54 which cooperate with and are splined to peripheral splines 56 formed on the hubs 30 and 32 of the side gears 26 and 28 respectively whereby the friction surfaces of the members 52 are drivingly connected to the gear teeth 27 and 29 of the side gears. The periphery 53 of each of the members 52 is spaced from the adjacent internal wall 11 of the casing 10 and adapted to rotate relative thereto while, as the result of the above described spline connection, the members 52 are adapted to rotate unitarily with while being axially movable relative to the side gear carrying the same. Thus, it is seen that the hubs 30 and 32 constitute carrying means for the friction members 52 of the clutch assembly 48.

The members 50 are substantially annular in form having an internal opening which is radially spaced from hubs 30 and 32 and each are provided with a periphery 51 which is radially spaced from the internal wall 11 of the casing 10. Further, the members 50 are provided with a plurality of circumferentially spaced driving means in the form of tangs 58 which extend radially from the periphery 51 thereof and register with and cooperate with axially extending keyways 60 formed in the casing 10, whereby the members 50 are adapted to rotate unitarily with the casing 10 while being axially movable relative thereto; the members 50 including the tangs 58 are disposed axially intermediate the side gears 26 and 28 and the adjacent end walls 10A and 10B respectively of the casing 10.

As shown in FIGS. 1, 2 and 3, four members 50 are interleaved with three members 52; however, the cooperating numbers of the members may be varied to obtain the desired results. Additionally, the members 50, although shown having two axially spaced tangs 58 with each tang being disposed in an axially extending keyway 60, may be provided with other numbers of tangs 58 cooperating with a suitable number of keyways 60. It is also understood that other forms of drive means besides tangs may be utilized.

Resilient means are provided for resiliently pressing the members 50 and 52 into engagement with each other thereby providing a preload on the clutch assembly 48. More particularly, each clutch assembly 48 includes an annular resilient member 72 which is axially deformed and adapted to be axially compressed to impose its resilient affect upon the members 50 and 52. As shown, the resilient member 72 is in the form of a spring washer commonly referred to as a Belleville spring and is disposed about the hub 30 and 32 respectively of the side gears 26 and 28 and is positioned intermediate the axially innermost member 50 and the back or engaging face 74 of the side gears 26 and 28 and concavely with respect to the engaging face.

The clutch assemblies 48 also each include holding means in the form of axially spaced circumferentially elongated abutting means shown generally at 62. More particularly, each clutch assembly 48 is in the form of a unitary self-contained clutch pack which may be inserted into the casing 10 as a preassembled unit. To this end, the abutting means 62 each includes a pair of axially spaced radially extending and circumferentially elongated abutting surfaces 64 and 66 integrally interconnected by an axially and circumferentially extending web 68; the web 68 extending axially in a position circumferentially intermediate the tangs 58. The abutting means 62 shown in the drawings is conveniently formed by two members 62A and 62B of substantially rectangular cross-section; however, it should be noted that other numbers of channel members may be utilized in preparing the abutting means.

The abutting means radially overlies and engages the axially outer side of the outer friction member 50 and the axially inner side of the resilient washer 72 and axially compresses the latter thereby holding the members 50 and 52 and the resilient washer in a resiliently preloaded clutch pack arrangement. The resilient washer 72, as shown in the drawings, is of exaggerated axially deformed configuration for illustration purposes; in the actual construction of this embodiment, the resilient washer may be compressed substantially flat. Further, if desired, the resilient washer 72 may be provided with internal splines splined to the hub 30 or 32 which it surrounds or may be provided with tangs 58 received in the slots 60 and, when compressed substantially flat, may function as additional friction surface means as well as being a resilient washer.

As shown, the abutting means 62 is assembled by stacking and compressing the friction members 50 and 52 and the resilient washer 72 and then the two members 62A and 62B are slipped into position. When the assembly 48 is placed in the casing 10, the abutting means 62 is positioned about the periphery of the friction members 50 and 52 and of the axially aligned tangs 58 of the members 50 in each of the keyways 60 with the web 68 thereof interposed between the peripheries of the friction members and the bore 11 of the casing and circumferentially between the tangs 58. Accordingly, it is seen that the assemblies 48 are axially movable relative to both the casing 10 and the side gears 26 and 28 and the abutting means 62 is separate from the casing 10 and the gear train.

The abutting means 62 also provides a pilot for the members 52 relative to the casing 10 to inhibit the members 52 from wearing upon the casing. To this end, the two axially extending keyways 60 are formed in the casing 10 preferably by drilling the same in an axial direction completely through the casing. The keyways 60 are circumferentially spaced at intervals which correspond to the spacing of the tangs 58 and have a cross-sectional configuration where it intersects the internal wall or bore 11 which is substantially semicircular; each keyway having a diameter sufficiently large so as to be spaced from the semicircular tangs 58 received therein. The abutting means is also integrally provided with radially extending axially elongated outer portions 70 which are received in the keyways 60 aligned therewith, which outer portions are semicircular in cross-section and have an outer periphery that cooperatively conforms to and axially slidingly engages the keyways 60 receiving the same and an inner periphery which cooperatively conforms and axially slidably engages the tangs 58 of the plates 50. Accordingly, the abutting means 62 are drivingly and pilotingly interposed between the casing 10 and the tangs 58 in a wear resisting and containing relationship.

The abutting surfaces 64 and 66 extend radially inwardly to a position where they are spaced slightly radially outwardly from the adjoining periphery of the adjacent side gear 26 or 28 and the periphery of the engaging faces 10A and 10B of the casing 10 so that the engaging faces 10A and 10B and the side gears 26 and 28 do not interfere with the axial movement of the clutch assemblies 48. With the abutting means 62 positioned as shown, it is readily apparent that the clutch assemblies 48 may easily be inserted into the casing 10 as a unitary self-contained clutch pack separately from the other components of the differential unit which are assembled thereinto; it being understood that the internal splines on the members 52 are properly axially aligned in the assembly of the assemblies 48 so that the side gears 26 and 28 may easily be inserted thereinto.

Means are provided to impose an engaging load on the clutch assemblies 48 in response to the transmission of torque by the differential transmission unit 12. More particularly, the teeth 27 and 29 of the side gears 26 and 28 and the teeth 37 and 39 of the pinion gears 36 and 38 intermeshed therewith are preferably formed with positive pressure angles so that upon the transmission of torque between the intermeshed teeth, the same urge the back or radially extending engaging faces 74 of the side gears 26 and 28 respectively, which act as pressure plates, axially outwardly to press against the portion of the assemblies 48 interposed directly axially intermediate the same and the adjoining surfaces 10A and 10B of the casing 10, thereby imposing an engaging load on the friction surfaces of the members 50 and 52. It is seen, then, that the teeth 27 and 29 of the side gears 26 and 28 respectively not only are operatively connected to the pinion gears to transmit torque therefrom to the axle shafts 18 and 20 respectively, but are also operatively connected to the back face portion 74 of the side gears and function to urge the same axially outwardly to engage the clutch assemblies 48 by compressing the assemblies against the surfaces 10A and 10B of the casing 10.

It is apparent that, upon outward movement of the side gears 26 and 28, the engaging face 74 thereof engages the resilient washer 72 disposed axially outwardly thereof and by acting through the same imposes a compressing load on the members 50 and 52. Additionally, by rotating the clutch assembly 48 180° about a diametrically extending axis prior to insertion in the differential unit 12 that the resilient washer 72 will be disposed adjacent the engaging face 10A or 10B instead of adjacent the engaging face 74 of the side gear 26 or 28; such a mere reversal of position does not alter the function or operation of the assembly.

Figure 4:
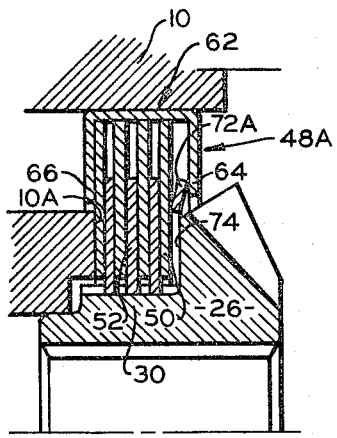
FIGS. 4 and 5 are fragmentary sectional views of other embodiments of resiliently preloaded clutch means of this invention.

It should be noted that the clutch assembly 48 can be formed in many manners other than that shown in FIG. 2 while still functioning satisfactorily. FIG. 4 discloses one such modification 48A of the clutch assembly 48 wherein a spring washer 72A is provided with an enlarged internal radial dimension while being formed concavely with respect to the side gear 26 and disposed between the radially extending surface 64 of the abutting means 62 and the axially inner friction member 50 thereby preloading members 50 and 52. The spring washer 72A is positioned radially outwardly from the periphery of the side gear 26 and disposed in such a position that, upon the side gear 26 moving axially outwardly, the members 50 and 52 are compressed between the engaging faces 74 and 10A independently from the axial load imposed on the members 50 and 52 by the spring washer 72A; the washer 72A being shown out of its substantially flat condition for purposes of illustration. In this case also the clutch assembly can be inserted in the differential device with the spring washer 72A positioned radially outwardly from the engaging face 10A, that is rotated 180° about a diametrically extending axis, without effecting its operation.

Figure 5:
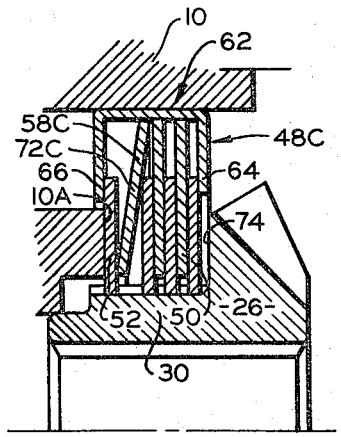

Another modification of the clutch assembly is shown at 48C in FIG. 5 wherein a spring washer 72C formed with tangs 58C thereon is positioned intermediate a pair of members 52. The resilient member 72C is also provided with friction surfaces thereon and, upon being compressed substantially flat by the abutting means 62 not only provides a resilient load upon all the members of the assembly 48C but also functions as a friction member.

It is readily apparent from the above that many different arrangements of resilient means and friction members can be utilized within the scope of this invention. It is even contemplated that more than one or even all the members 50 and 52 may be formed as resilient washers and compressed substantially flat by the abutting means 62 thereby providing a resiliently preloaded clutch pack. Additionally, such members may be utilized in a series or parallel or series-parallel relationship to obtain the desired load characteristics.

As shown in the drawings a space has been provided between the clutch assembly 48, 48A and 48B and the engaging face 74 of the adjacent side gear 26 or 28; however, such has been greatly exaggerated for the purposes of illustration. It is preferred that only a relatively small spacing exists therebetween so that upon outward movement of the side gears, additive loads on the clutch pack will easily occur. It is also contemplated that an interference fit can exist between the clutch assemblies and the back faces 74 of the side gears and the adjacent end walls 10A and 10B of the casing so that the assemblies, in addition to the resilient preload, are also preloaded in a nonresilient manner between the side gears and the casing 10. However, since this latter preload will eliminate the backlash between the intermeshed gear teeth proper provision should be made therefor.

While only a single embodiment of this invention and modifications thereof have been shown and described, it is understood that such is for the purpose of illustration only and not for the purpose of limiting this invention as defined in the following claims.

What is claimed is:
1. In a differential transmission unit the combination comprising
  (a) a rotatable casing,
  (b) shaft means drivingly connected to said casing and extending inwardly thereof,
  (c) a pair of compensating gears rotatably mounted on said shaft means,
  (d) a pair of side gears rotatably mounted in said casing and each being in meshing engagement with said compensating gears,
  (e) a unitary self-contained clutch means associated with at least one of said side gears for frictionally connecting said side gear to said casing, said unitary self-contained means comprising
    (1) a first and a second annular and radially extending friction surface member disposed in an axial side by side cooperative relationship with each other,
    (2) an annular resilient member being axially deformed and axially compressed and disposed in an axial side by side relationship with one of sadi first and second members and resiliently pressing said first and second members into frictional engagement, and
    (3) a pair of clutch pack forming means formed separately from and axially movable relative to said casing and said gears,
  (f) a pair of first driving means extending radially outward from said first member and drivingly connecting the same to said casing and second driving means drivingly connecting said second member to said one side gear,
  (g) each of said clutch pack forming means including a pair of axially spaced radially and circumferentially extending abutting surfaces and circumferentially and axially extending means securing said abutting surfaces in an axially spaced relationship,
  (h) said abutting surfaces being disposed on opposed axial sides of said members and abutting the axial outer portion thereof at locations at least circumferentially intermediate said pair of first driving means and compressing said resilient member whereby said resilient member presses said first and second members into frictional engagement with the action and reaction loads thereof being imposed on said abutting surfaces independently of said casing and said gears.

2. A differential transmission unit according to claim 1 wherein said axially extending means extends peripherally of said members and is interposed between the same and said casing.

3. A differential transmission unit comprising in combination
  (a) a casing having an axis of rotation,
  (b) a par of axially spaced and opposed side gears rotatably disposed in said casing coaxially therewith,
  (c) a pair of compensating gears disposed axially intermediate said side gears and in meshing engagement therewith and including means drivingly connecting the same to said casing for unitary rotation therewith and rotation relative thereto,
  (d) at elast one of said side gears being axially spaced from said casing,
  (e) and an integral self-contained clutch pack means insertable in said casing as a separate unit and disposed in said casing in the axial space between said one side gear and said casing,
  (f) said clutch pack means including
    (1) first and second annular friction members having radially extending cooperating friction surfaces thereon, (2) an annular resilient member being axially deformed and axially compressed and engaging at least one of said friction members and resiliently urging said friction members into engagement, and (3) a pair of clutch pack forming means formed separately from and axially movable relative to said casing and said gears, (g) a pair of circumferentially spaced first driving means extending radially outwardly from said first member and drivingly connecting the same to said casing for unitary rotation and axial movement relative thereto and second driving means drivingly connecting said second member to said one side gear for unitary rotation and axial movement thereto, (h) each of said clutch pack forming means including a pair of axially spaced radially extending and circumferentially elongated abutting surfaces and circumferentially and axially extending means securing said abutting surfaces in an axially spaced relationship, (i) said abutting surfaces being disposed on opposed axial sides of said members and radially and circumferentially overlying at least a portion of the axially outer of said members and abutting the axial outer portion thereof and compressing said resilient member and said first and second members therebetween, (j) said axially extending means extending peripherally of said members radially intermediate said members and said casing and circumferentially intermediate said pair of first driving means.

4. A differential transmission unit according to claim 3 wherein (a) said one side gear has an axially outer annular radially extending first face thereon, (b) said casing has an axially inner annular radially extending second face thereon disposed in axial spaced relationship with said first face, (c) said members are disposed axially intermediate said first and second faces, (d) said abutting surfaces being spaced radially outwardly from said faces, (e) portions of said differential transmission device are operatively connected to and adapted to urge said first face axially outwardly toward said second face in response to the transmission of torque by said transmission device thereby compressingly engaging said first and second members therebetween.

5. A differential transmission according to claim 4 wherein said first driving means includes a portion of said circumferentially and axially extending means, the latter being disposed radially intermediate the remainder of said first driving means and said casing.

6. A differential transmission unit comprising in combination (a) a casing having an axis of rotation, (b) a pair of axially spaced and opposed side gears rotatably disposed in said housing coaxially therewith, (c) a pair of compensating gears disposed axially intermediate said side gears and in meshing engagement therewith and including means drivingly connecting the same to said casing for unitary rotation therewith and rotation relative thereto, (d) one of said side gears having an axially outer radially extending first engaging face thereon, (e) said casing having an axially inner radially extending second engaging face thereon disposed in an axially spaced relationship with said first engaging face, (f) hub means drivingly connected to said one side gear and extending axially outwardly therefrom and positioned radially inwardly from said engaging faces, (g) and an integral self-contained clutch pack means insertable in said casing as a separate unit and disposed in said housing in the axial space between said one side gear and said casing and surrounding said hub means, (h) said clutch pack means including (1) first and second friction members having annular radially extending cooperating friction surfaces thereon with said first friction member being radially spaced from said hub means and freely rotatable relative thereto and said second friction member including means drivingly connecting the same to said hub means for unitary rotation therewith and axial movement relative thereto, (2) an annular resilient member being axially deformed and axially compressed and engaging one of said friction members and resiliently urging said friction members into engagement, (3) a pair of clutch pack forming means formed separately from and axially movable relative to said casing and said gears, (i) pair of circumferentially spaced first driving means extending radially outwardly from said first member and drivingly connecting the same to said casing for unitary rotation and axial movement relative thereto, (j) each of said clutch pack forming means being of channel configuration and including a pair of axially spaced radially extending and circumferentially elongated abutting surfaces and circumferentially and axially extending means securing said abutting surfaces in an axially spaced relationship, (k) said abutting surfaces being disposed on opposed axial sides of siad members and radially and circumferentially overlying at least a portion of the axially outer of said members and abutting the axially outer portion thereof and compressing said resilient member and said first and second members therebetween, (l) said abutting surfaces being disposed radially outwardly from said engaging faces and said axially extending means being disposed radially intermediate said members and said casing, (m) said engaging faces being adapted to axially engage the axially outer of said members at a position radially inwardly from said abutting surfaces.

7. A differential transmission unit according to claim 6 wherein said driving means includes a portion of said circumferentially and axially extending means with the latter being disposed radially intermediate the remainder of said first driving means and said casing.

References Cited by the Examiner

UNITED STATES PATENTS

| 1,750,981 | 3/1930 | Wildhaber | 74—711 |
| 1,883,725 | 10/1932 | Guilmette | 74—711 |
| 2,930,256 | 3/1960 | Wildhaber | 74—711 |
| 2,966,076 | 12/1960 | O'Brien | 74—711 |
| 3,052,137 | 9/1962 | Russell | 74—710.5 |

FOREIGN PATENTS

| 1,236,945 | 6/1960 | France. |
| 869,103 | 5/1961 | Great Britain. |

DAVID J. WILLIAMOWSKY, *Primary Examiner.*

J. A. WONG, *Assistant Examiner.*